US007303181B1

(12) United States Patent
Nymann

(10) Patent No.: US 7,303,181 B1
(45) **Date of Patent: *Dec. 4, 2007**

(54) JACK FOR HEAVY OBJECTS

(76) Inventor: Robert Nymann, 1306 Melville Dr., Las Vegas, NV (US) 89102

( * ) Notice: Subject to any disclaimer, the term of this patent is extended or adjusted under 35 U.S.C. 154(b) by 0 days.

This patent is subject to a terminal disclaimer.

(21) Appl. No.: 10/976,058

(22) Filed: Oct. 26, 2004

Related U.S. Application Data

(63) Continuation of application No. 10/793,443, filed on Mar. 4, 2004.

(51) Int. Cl.
*B60P 1/48* (2006.01)

(52) U.S. Cl. ........................ 254/8 R; 254/2 B; 254/3 R

(58) Field of Classification Search ................ 254/8 R, 254/133 R, 134, 2 B, 93 H, 89 HP, 93 R, 254/10 B, 3 R
See application file for complete search history.

(56) References Cited

U.S. PATENT DOCUMENTS

| | | | | |
|---|---|---|---|---|
| 3,844,421 | A * | 10/1974 | Nielsen | 414/678 |
| 3,958,793 | A * | 5/1976 | Garate | 254/10 B |
| 4,724,930 | A * | 2/1988 | VanLierop | 187/204 |
| 5,372,353 | A * | 12/1994 | West | 254/10 B |
| 6,338,470 | B1 * | 1/2002 | Steely et al. | 254/124 |
| 6,343,556 | B1 | 2/2002 | Lanphear | |
| 6,601,430 | B2 | 8/2003 | McClellan | |
| 6,779,780 | B2 * | 8/2004 | Arzouman | 254/8 B |

* cited by examiner

*Primary Examiner*—Lee D. Wilson
(74) *Attorney, Agent, or Firm*—Rob L. Phillips; Greenberg Traurig

(57) ABSTRACT

A transmission Jack and apparatus that can raise and lower heavy objects between a floor surface and a higher elevation is disclosed. The transmission jack and apparatus includes a bottom frame mounted on a plurality of wheels. Pivotally attached to the bottom frame is a pair of hinge elements that support a plurality of support bars, with the support bars always remaining parallel to a ground surface. The support bars can be raised or lowered through a pair of metal cylinders and internal rods which are hooked up to a hydraulic pump. A handle attached to the hydraulic pump allows an individual to raise or lower the plurality of support bars by pumping an oil-based hydraulic fluid into the pair of metal cylinders, thereby pushing out the Internal rods, which then engage the hinge elements.

24 Claims, 9 Drawing Sheets

JACK FOR HEAVY OBJECTS

CROSS REFERENCE TO RELATED APPLICATIONS

This application is a continuation of application Ser. No. 10/793,443 filed Mar. 4, 2004 hereby incorporated herein by reference.

BACKGROUND

The present invention is that of a new and improved transmission jack and apparatus that can raise and lower heavy objects between a floor surface and a higher elevation.

DESCRIPTION OF THE PRIOR ART

U.S. Pat. No. 6,601,430, issued to McClellan, discloses a lifting platform with a scissor type jack.

U.S. Pat. No. 6,343,556, issued to Lamphear, discloses an adjustable height table that includes a base frame, a slider frame assembly, a generally planar support surface and a lifting mechanism.

SUMMARY OF THE INVENTION

The present invention is that of a new and improved transmission jack and apparatus that can raise and lower heavy objects between a floor surface and a higher elevation. The transmission jack and apparatus comprises a bottom frame mounted on a plurality of wheels. Pivotally attached to the bottom frame is a pair of hinge elements that support a plurality of support bars, with the support bars always remaining parallel to a ground surface. The support bars can be raised or lowered through a pair of metal cylinders and internal rods which are hooked up to a hydraulic pump. A handle attached to the hydraulic pump allows an individual to raise or lower the plurality of support bars by pumping an oil-based hydraulic fluid into the pair of metal cylinders, thereby pushing out the internal rods, which then engage the hinge elements.

There has thus been outlined, rather broadly, the more important features of a transmission jack and apparatus that can raise and lower heavy objects between a floor surface and a higher elevation in order that the detailed description thereof that follows may be better understood and in order that the present contribution to the art may be better appreciated. There are, of course, additional features of the transmission jack and apparatus that can raise and lower heavy objects between a floor surface and a higher elevation that will be described hereinafter and which will form the subject matter of the claims appended hereto.

In this respect, before explaining at least one embodiment of the transmission jack and apparatus that can raise and lower heavy objects between a floor surface and a higher elevation in detail, it is to be understood that the transmission jack and apparatus that can raise and lower heavy objects between a floor surface and a higher elevation is not limited in its application to the details of construction and to the arrangements of the components set forth in the following description or illustrated in the drawings. The transmission jack and apparatus that can raise and lower heavy objects between a floor surface and a higher elevation is capable of other embodiments and being practiced and carried out in various ways. Also, it is to be understood that the phraseology and terminology employed herein are for the purpose of descriptions and should not be regarded as limiting As such, those skilled in the art will appreciate that the conception, upon which this disclosure is based, may readily be utilized as a basis for the designing of other structures, methods and systems that can raise and lower heavy objects between a floor surface and a higher elevation. It is important, therefore, that the claims be regarded as including such equivalent constructions insofar as they do not depart from the spirit and scope of the present invention.

It is therefore an object of the present invention to provide a transmission jack and apparatus that can raise and lower heavy objects between a floor surface and a higher elevation which has all of the advantages of the prior art and none of the disadvantages.

It is another object of the present invention to provide a transmission jack and apparatus that can raise and lower heavy objects between a floor surface and a higher elevation which may be easily and efficiently manufactured and marketed.

It is another object of the present invention to provide a transmission jack and apparatus that can raise and lower heavy objects between a floor surface and a higher elevation which is of durable and reliable construction.

It is yet another object of the present invention to provide a transmission jack and apparatus that can raise and lower heavy objects between a floor surface and a higher elevation which is economically affordable and available for relevant market segments of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1A:
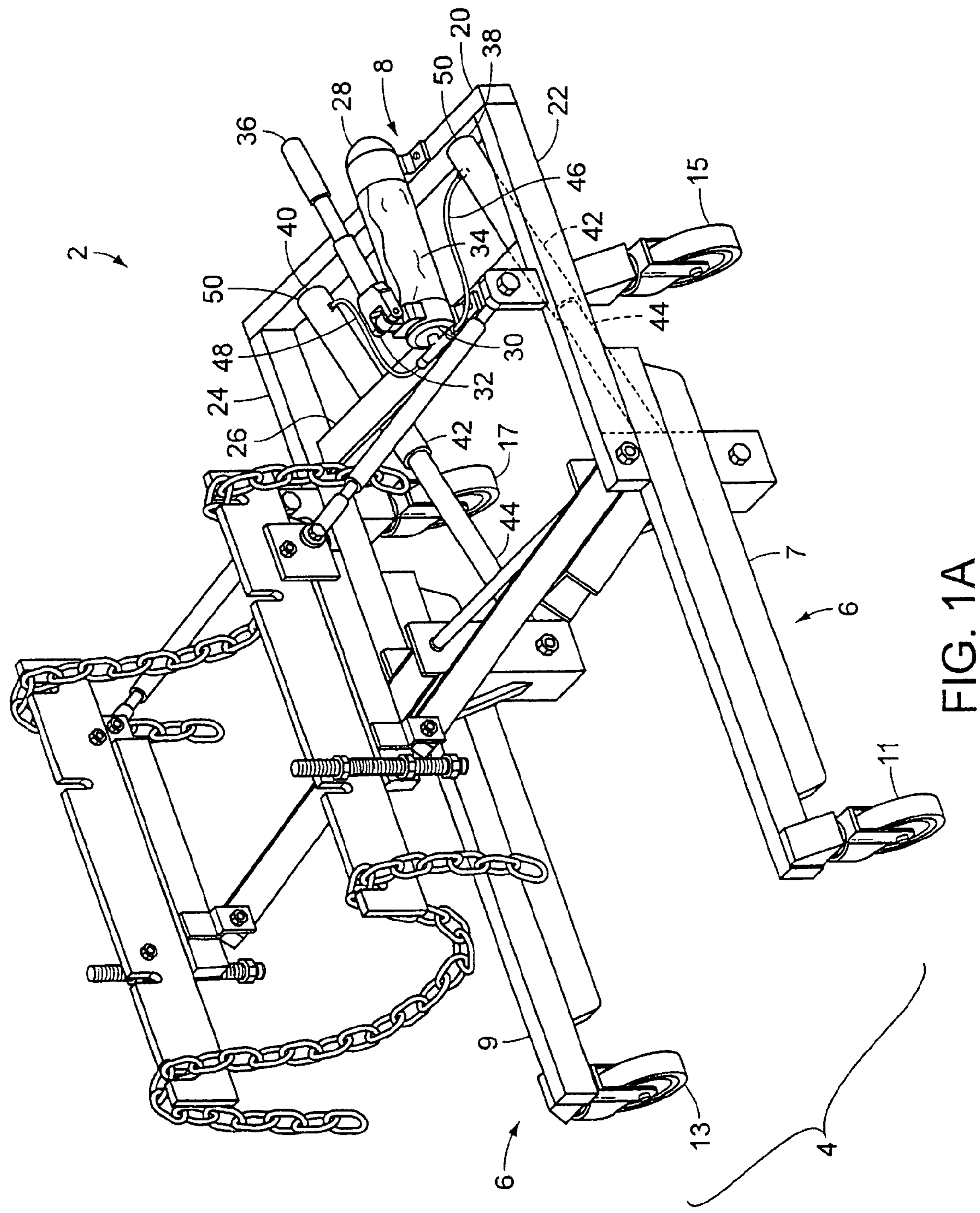
FIG. 1A shows a perspective view of the present invention in an upright position.
Figure 1B:
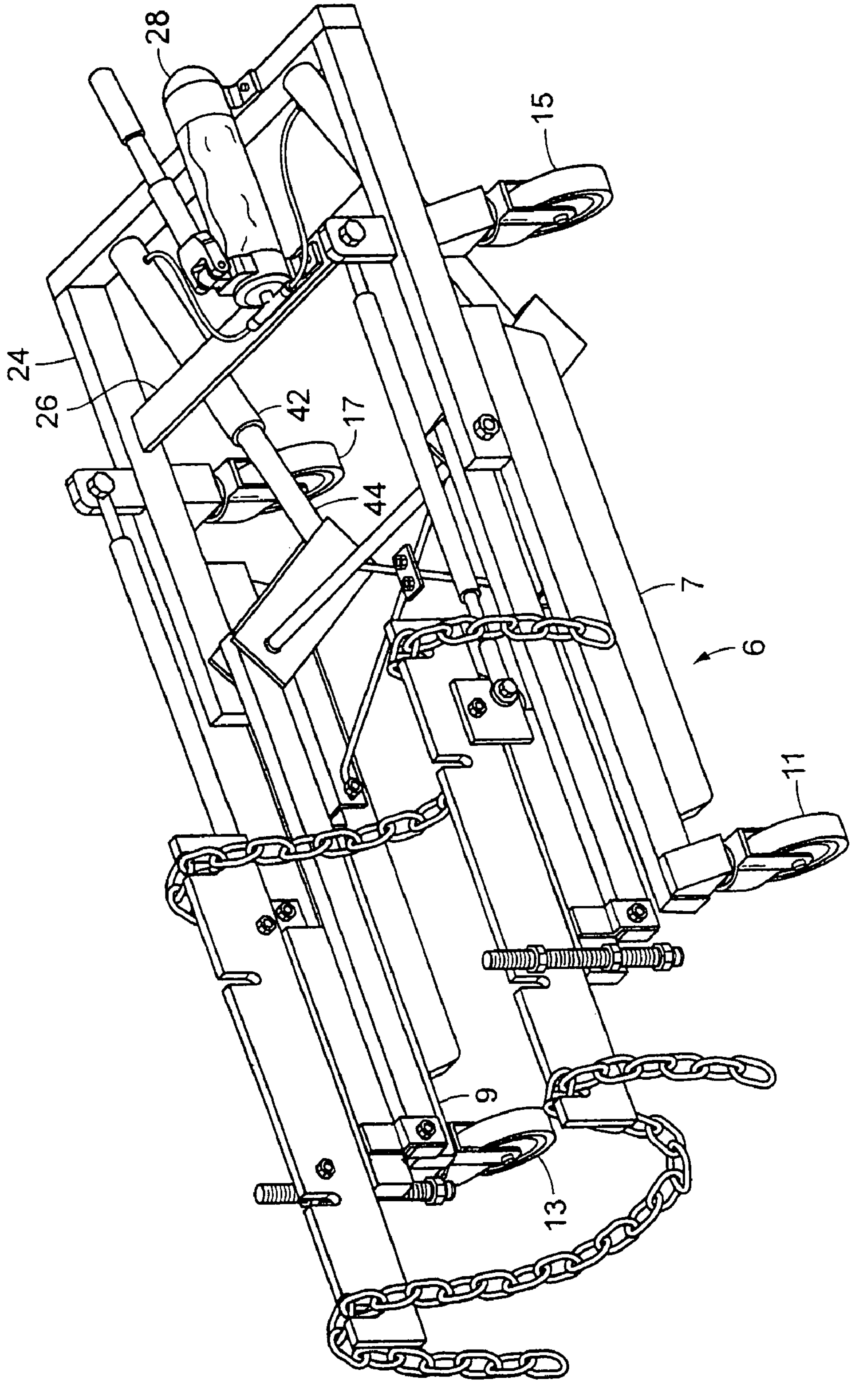
FIG. 1B shows a perspective view of the present invention in a lowered position.

FIG. 1A shows a perspective view of the present invention in an upright position, while FIG. 1B shows a perspective view of the present invention in a lowered position. The present invention is essentially a transmission & parts assistance apparatus 2 that is used in conjunction with vehicles, preferably trucks and automobiles. The present invention works best when using the apparatus 2 to lift a transmission off of a floor into an off-the-floor position for either working on the transmission or other heavy parts or assist an individual in placing the transmission back within an automobile. The apparatus 2 can be also used in the reverse context to lower a removed heavy object to ground level. Alternatively, the apparatus 2 could be used to lower or raise other items of heavy equipment that are not necessarily limited to automobile or truck components.

Apparatus 2 comprises a bottom frame 4 that has two ends, a front end and a rear end, and has two sides, a left side and a right side. Bottom frame 4 is comprised of two separate portions which comprise a support frame 6 and a mounting frame 8. Support frame 6 itself comprises a left bar 7 and a right bar 9, with each bar having two ends, a first end and a second end. Rotatable wheels 11 and 13 are attached to the first end of left bar 7 and right bar 9, respectively, while the second end of each bar is fixedly attached to the mounting frame 8. Rotatable wheels 11 and 13 can also be designed to be castor wheels The mounting frame 8 has a U-shaped bracket that comprises a front mounting bracket 20, a left mounting bracket 22, and a right mounting bracket 24. Each bracket of the mounting frame 8 has two ends, a first end and a second end, and furthermore, has two side surfaces, a top side surface and a bottom side surface. Furthermore, each bracket of the mounting frame 8 has two sides, an inner side and an outer side.

The second end of the left mounting bracket 22 is fixedly attached to the first end of the front mounting bracket 20, while the second end of the right mounting bracket 24 is fixedly attached to the second end of the front mounting bracket 20. Left mounting bracket 22 and right mounting bracket 24 are parallel to one another, giving the mounting frame 8 a U-shape. The second end of the left bar 7 is fixedly attached to the bottom side surface of the left mounting bracket 22, while the second end of the right bar 9 is fixedly attached to the bottom side surface of the right mounting bracket 24. Wheels 15 and 17 are rotatably attached to the bottom side surface of left mounting bracket 22 and right mounting bracket 24, respectively. Rotatable wheels 15 and 17 can also be designed to be castor wheels.

Additional framing elements are present. Support bracket 26 has two ends, a first end and a second end, and furthermore, has two side surfaces comprising a top side surface and a bottom side surface. The first end of support bracket 26 is attached to the inner side of the left mounting bracket 22, while the second end of support bracket 26 is attached to the inner side of the right mounting bracket 24.

Hydraulic pump 28 is mounted on the top surface of support bracket 26 and the top surface of front mounting bracket 20. Pump 28 has two ends, a first end and a second end, with the first end having an opening 30 to which a T-joint 32 is attached. Pump 28 has a volume of hydraulic fluid 34 located within it, with the hydraulic fluid 34 preferably being some oil-based product. Lever 36, having two ends, an attached end and a free end, has the attached end pivotally attached to the hydraulic pump 28 near the first end of the pump 28.

Apparatus 2 has two metal cylinders 38 and 40 which each have two ends, a first end and a second end. The second end of each cylinder is attached to the inner side surface of the front mounting bracket 20, with each cylinder facing slightly downward going from the second end to the first end of each cylinder. The first end of each cylinder has an opening 42, with a cylindrical metal rod 44 located within it.

Tubes 46 and 48 each have two ends, a first end and a second end, with the first end of each tube connected to the T-joint. The second end of tube 46 is attached to the cylinder 38 near the second end of cylinder 38, while the second end of tube 48 is attached to the cylinder 40 near the second end of the cylinder 40. The second end of each tube has an internal cavity 50 which is contiguous with the inside of the appropriately attached tube and the volume of hydraulic fluid 34 located within the hydraulic pump 28.

By grasping the free end of the lever 36 and pumping in an up-and-down manner, a small amount of volume of hydraulic fluid 34 is ejected from the hydraulic pump 28 and travels through the tubes 46 and 48 into the cylinders 38 and 40. This causes the pressure within each cavity 50 to build to an extent, causing the pressure to push the two rods 44 outward. To relieve the pressure on the rods 44, an individual can grasp the free end of the lever 36 and twist it slightly, allowing the hydraulic fluid within the cavities 50 to have an opening to travel back within the hydraulic pump 28.

Figure 2:
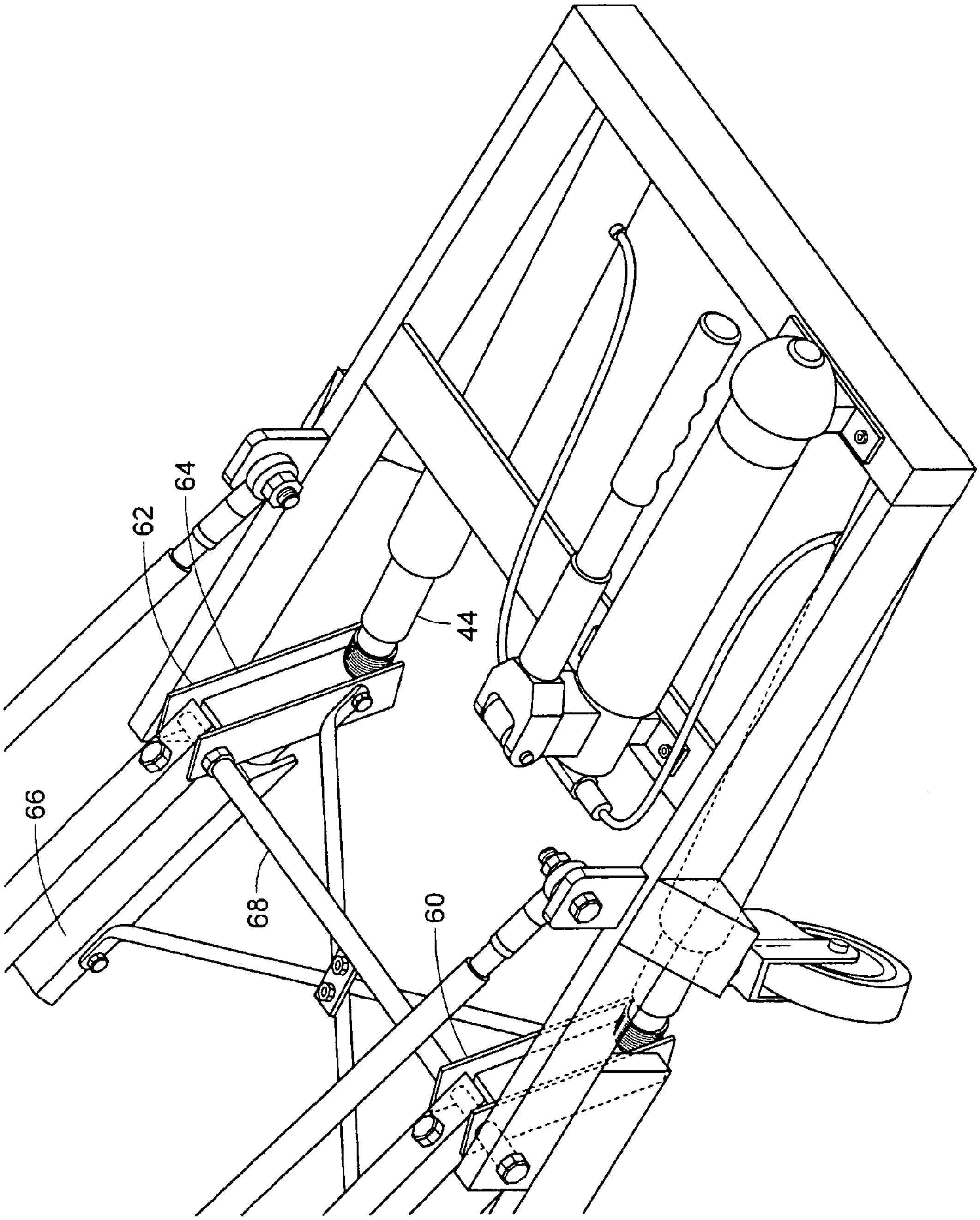
FIG. 2 shows a close-up perspective view of the left and right hinge elements of the present invention.

Referring now to FIG. 2, apparatus 2 also has two hinge elements comprising a left hinge element 60 and a right hinge element 62. The second end of a rod 44 is shown attached to hinge element 62. Each hinge element has two portions, a front hinge element 64 and a rear hinge element 66, with each of these two pieces having two ends, a first end and a second end. The first end of each rear hinge element 66 is fixedly attached to the second end of the front hinge element 64 at about a 120 degree angle. The second end of rod 44 is attached to the first end of the front hinge element 64. Hinge mounting rod 68 has two ends, a first end and a second end, with the first end of the hinge mounting rod 68 fixedly attached to the inner side of left mounting bracket 22, while the second end of the hinge mounting rod 68 is fixedly attached to the inner side of right mounting bracket 24. The second end of the front hinge 64 of left hinge element 60 is mounted on the hinge mounting rod 68 near the first end of the hinge mounting rod 68, while the second end of the front hinge element 64 of right hinge element 62 is mounted on the hinge mounting rod 68 near the second end of the hinge mounting rod 68.

As can be seen in FIG. 2, inward or outward movement of the second end of a rod 44 causes the hinge element 62 to move about its attachment point on the hinge mounting rod 68. When the second end of rod 44 pushes the first end of the front hinge element 64 inward and downward, the second end of each rear hinge element 66 goes upward.

Figure 3:
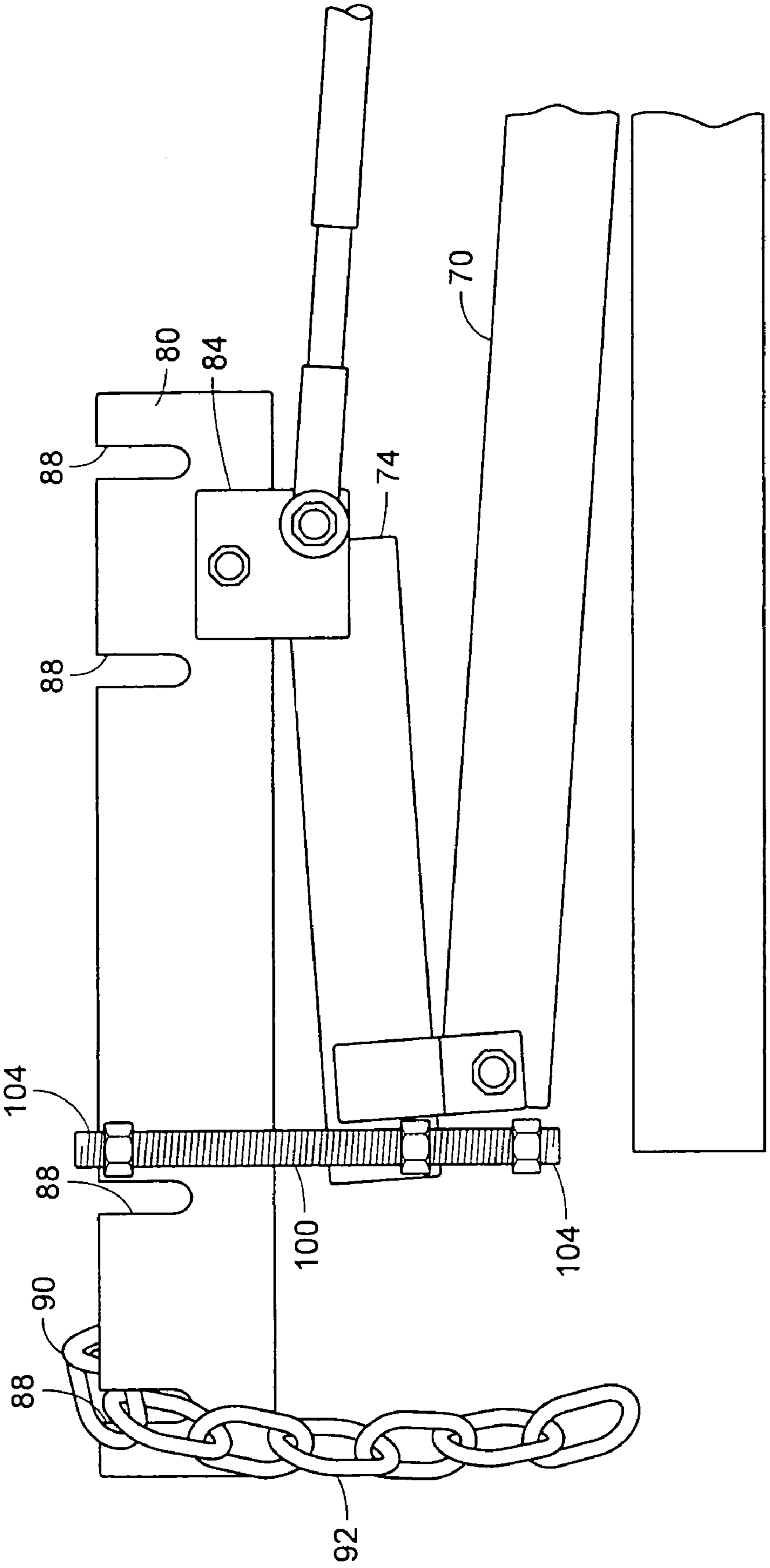
FIG. 3 shows a side view of the support bars used to successfully hold a transmission or other heavy object.
Figure 4:
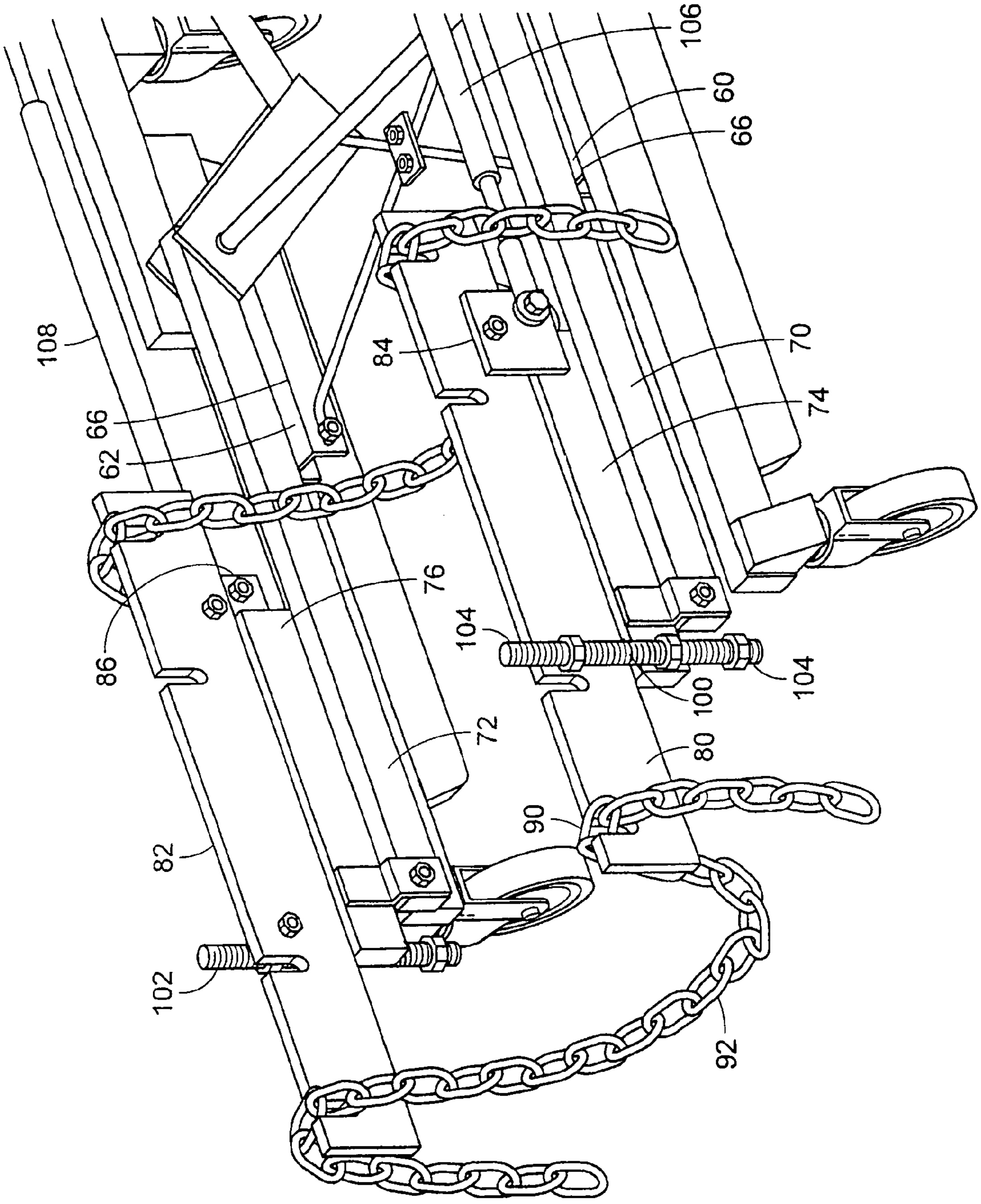
FIG. 4 shows a perspective view of the support bars used to successfully hold a transmission or other heavy object.

FIGS. 3 and 4 show side views and perspective views, respectively, of the support bars used to successfully hold a transmission or other heavy object. First level support bars 70 and 72 each have two ends, a first end and a second end. The first end of first level support bar 70 is attached to the top side of the rear hinge element 66 of hinge element 60, while the first end of the first level support bar 72 is attached to the top side of the rear hinge element 66 of hinge element 62.

Second level support bars 74 and 76 each have two ends, a first end and a second end. The second end of second level support bar 74 is pivotally attached to second end of first level support bar 70, and is located above the first level support bar 70. Furthermore, the second end of second level support bar 76 is pivotally attached to second end of first level support bar 72, and is located above the first level support bar 72.

Top level support bars 80 and 82 each have two ends, a first end and a second end. The first end of second level support bar 74 is fixedly attached to the first end of top level support bar 80 by bracket 84 and is located above the second level support bar 74. The first end of second level support bar 76 is fixedly attached to the first end of top level support bar 82 by bracket 86 and is located above the second level support bar 76. Each connection point between the top level support bars 80 and 82 with the second level support bars 74 and 76 is only slightly pivotal. Brackets 84 and 86, respectively, allow the second end of each top level support bar to move upward or downward a little bit, but the second end of each second level support bar is immobile and generally is not pivotable about the brackets.

Top level support bars 80 and 82 each have two sides, a top end and a bottom end, and furthermore, have two sides, an inner side and an outer side. The top end of each top level support bar has several ovaloid grooves 88, with each groove designed to allow a chain 90 from a chain link 92 to be placed into it.

Threaded rods 100 and 102 are present to provide support to the top level support bars 80 and 82 once a transmission is placed on top of them. Threaded rod 100 is attached to the outer side of top level support bar 80 and the second level support bar 74 near the second end of each, while threaded rod 102 is attached to the outer side of top level support bar 82 and the second level support bar 76 near the second end of each. Nuts 104 are fixedly attached to both the second ends of threaded rods 100 and 102 and the second ends of second level support bars 74 and 76. The middle nut 104 on each of the threaded rods 100 and 102 are attached to a location on the threaded rods 100 and 102 that have right-handed threaded, while the top nut 104 on each of the threaded rods 100 and 102 are attached to a location on the threaded rods 100 that have left-handed threaded.

Once each threaded rod is inserted through a set of nuts on the second end of a particular second level support bar and the second end of a particular top level support bar, then each threaded rod provides adjustment to perfectly align the transmission into its recess and also to provide extra stability and support to the apparatus 2 once it is holding a transmission.

Side support bars 106 and 108 provide stability and keeps bars 80, 82, 74, and 76 in a level position when raised or lowered, as determined by the weight of the part. These support bars are clearly shown in FIGS. 4 and 5, which shows a perspective, close-up view of side support bar 108. Side support bars 106 and 108 each have two ends, a first end and a second end, with the first end of the side support bar 106 being attached to the outer side of the top level support bar 80 near the first side of the top level support bar 80, while the second end of the side support bar 106 is attached to the left mounting bracket 22. The first end of the side support bar 108 is attached to the outer side of the top level support bar 82 near the first side of the top level support bar 82, while the second end of the side support bar 108 is attached to the right mounting bracket 24. The length of each side support bars 106 and 108 is fixed, as it is just designed to keep the apparatus 2 level when it is holding a heavy object.

Figure 5:
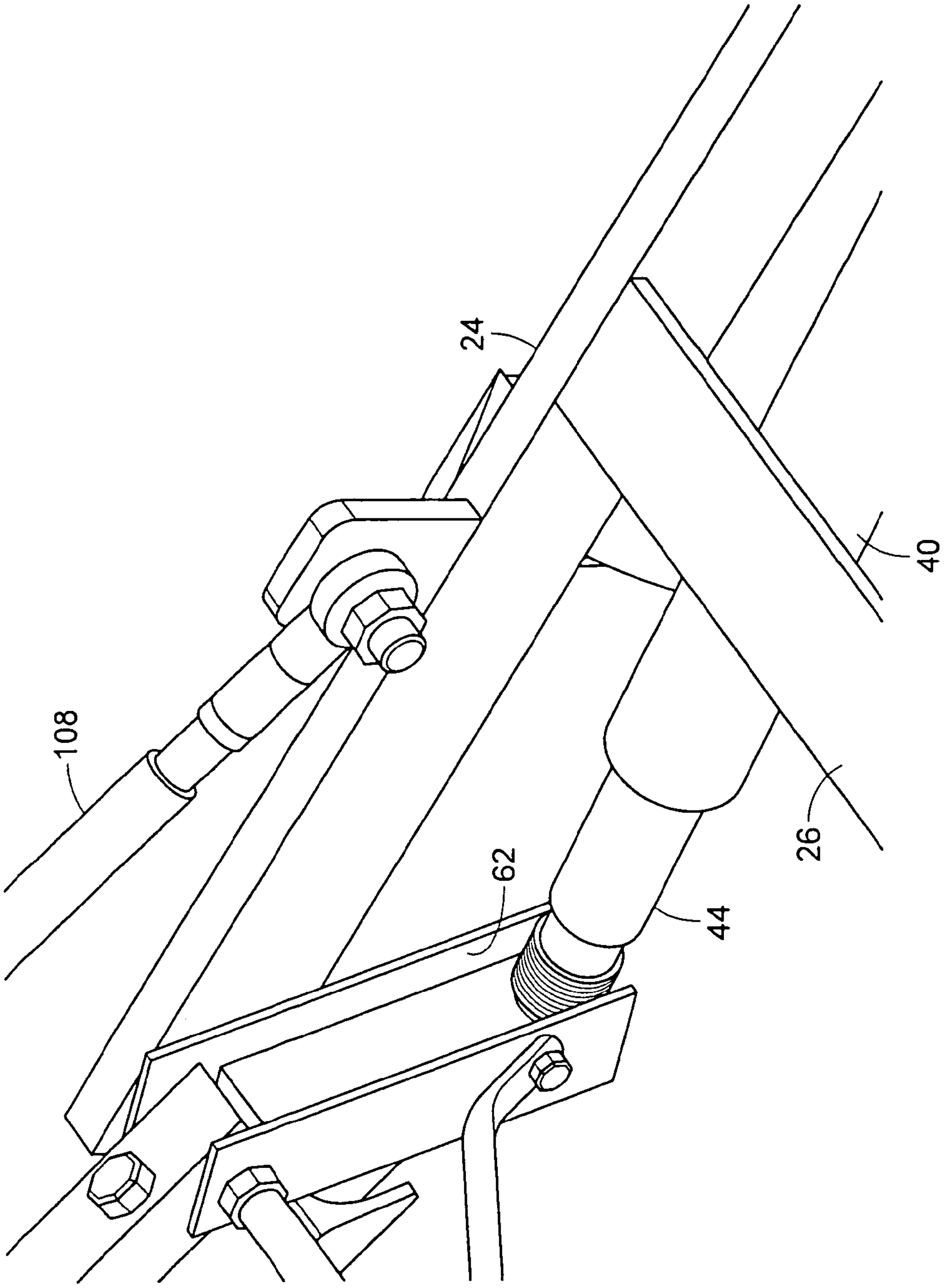
FIG. 5 shows a close-up perspective view showing the connectivity between a hinge element to a rod within a cylinder.

FIG. 5 shows a close-up perspective view showing the connectivity between hinge element 62 to rod 44 within cylinder 40.

Figure 6:
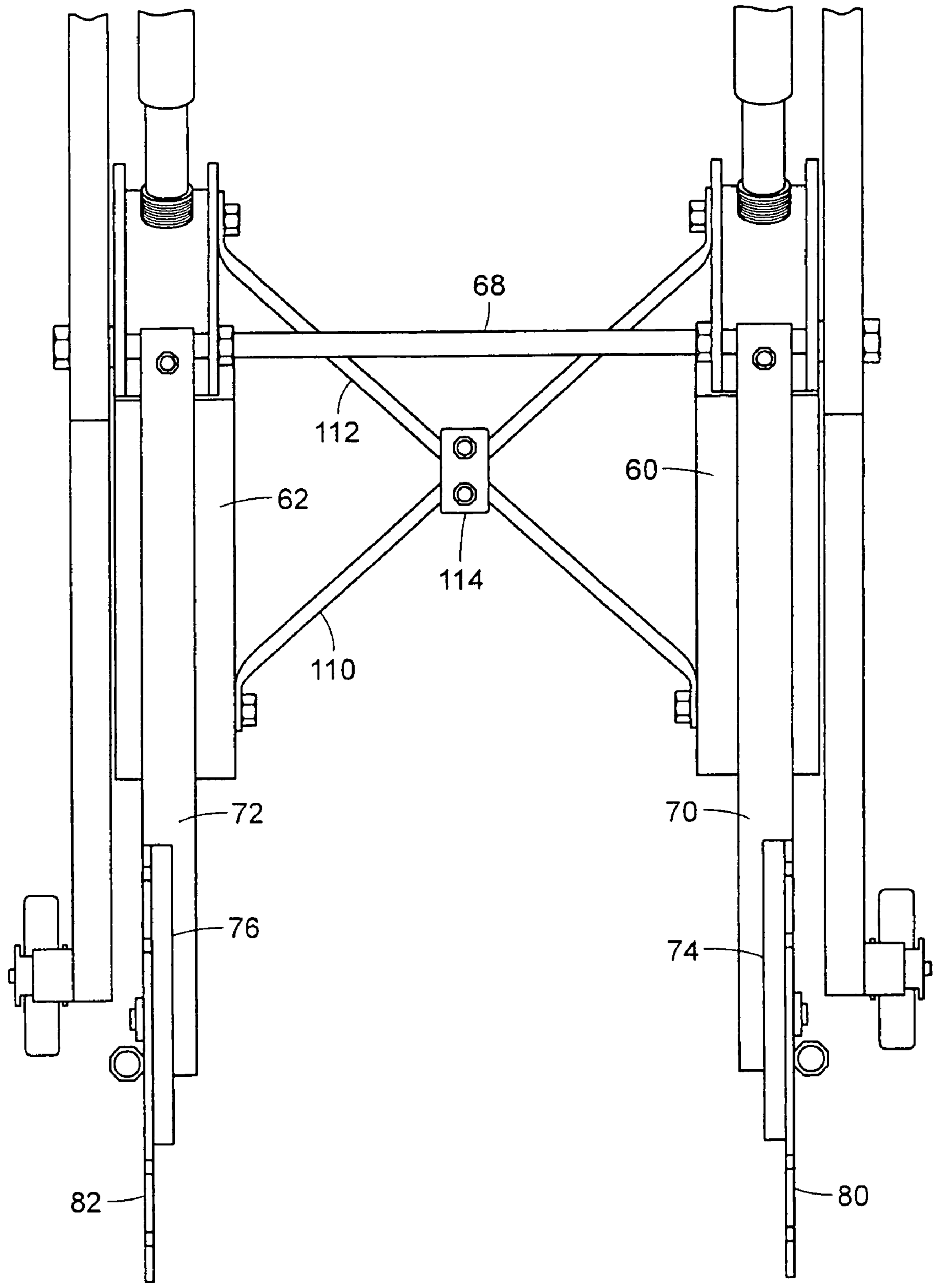
FIG. 6 shows a top view of the pair of stabilizer bars.
Figure 7:
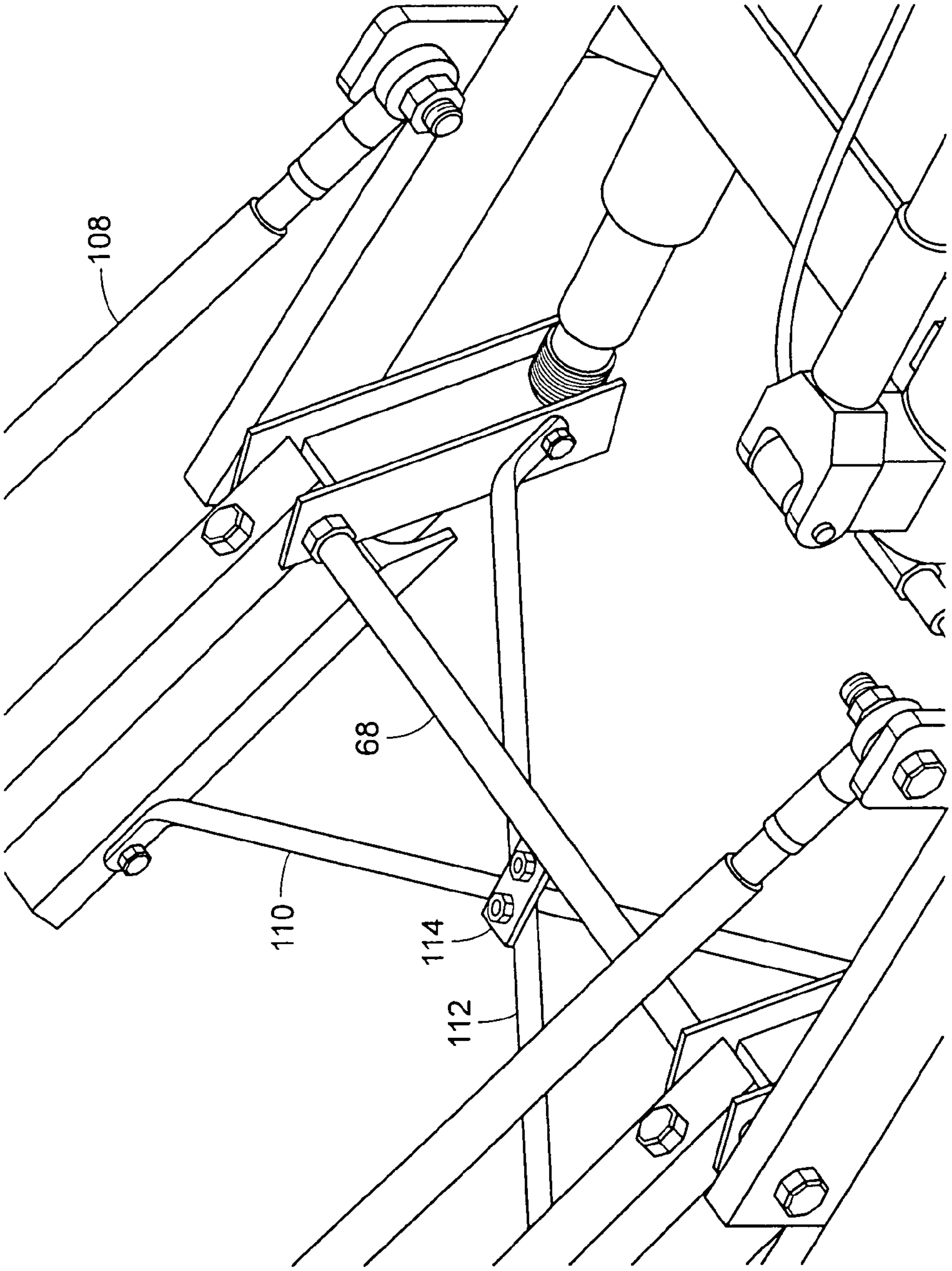
FIG. 7 shows a perspective view of the pair of stabilizer bars.

FIGS. 6 and 7 show top and perspective views, respectively, of the stabilizer bars 110 and 112. The stabilizer bars 110 and 112 are essentially set up in an X-pattern and bolted against the side of the inner side of the hinge elements 60 and 62. A connector plate 114 attaches the two stabilizer bars 110 and 112 to one another. The main purpose of the stabilizer bars 110 and 112 is to ensure that bars 70 and 72 are in unison when the apparatus 2 is raised and lowered.

Figure 8:
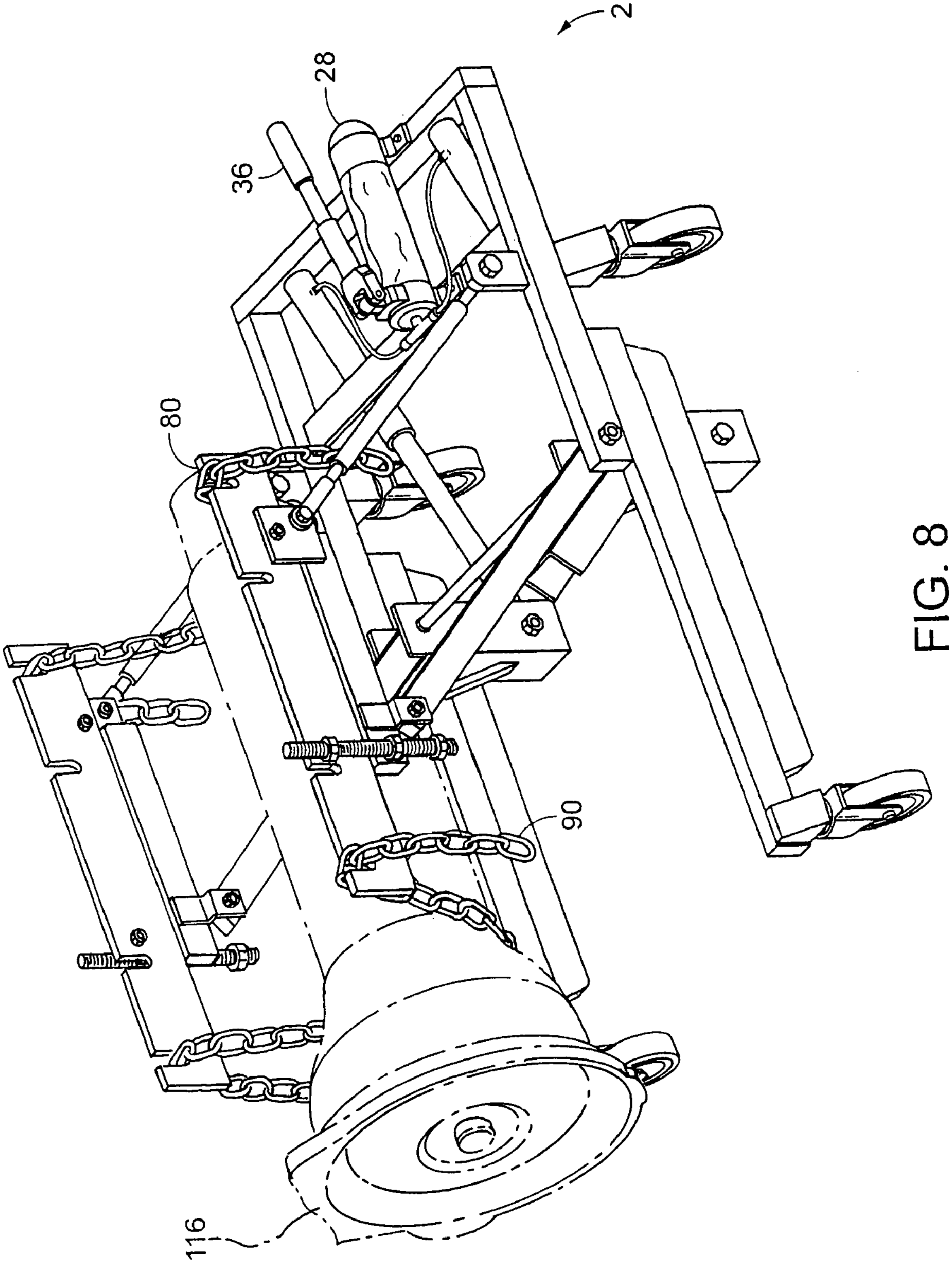
FIG. 8 shows how the apparatus is holding a transmission or other heavy objects.

FIG. 8 shows how the apparatus is holding a transmission 116. To get into this position, the lever 36 on the hydraulic pump 28 is turned and downward pressure is placed on the top level support bars, causing all the support bars to compress, as seen in FIG. 1A. Then, the apparatus 2 is placed so that the two vertical layers of support bars are on either side of a transmission on a floor surfaced. Then, a pair of chains 90 are draped over various ovaloid grooves 88 on the top level support bars 80 and 82. Because the ovaloid grooves' shape, the chain is "stuck" in the position set. The chains would be configured to wrap underneath crucial holding points on the transmission 116 and also be configured so that there is no slack in each chain 90.

Then, the lever 36 on the pump 28 would be pumped downward and upward in a repetitive manner. As previously described, each individual "pumping motion" on the pump 28 send a small volume of hydraulic fluid 34 located within the hydraulic pump 28 through tubes 46 and 48 and into the internal cavities 50 of the cylinders 38 and 40. This causes the rods 44 to push outward, turning each of the hinge elements. The turning of each of the hinge elements in the manner discussed causes the entire network of support bars to slowly "rise" with each pumping motion on the lever 36 of pump 28, causing the transmission 116 to slowly rise off of the floor. The presence of the lifting arms allow for easy mobility of the transmission 116 or other heavy object once it is sufficiently off of the ground surface. They also allow for easy placement of the transmission 116 or other heavy object to a desired location after it has been serviced.

In various alternative embodiments of the present invention, the hydraulic pump 28 and the cylinders 38 and 40 can have different sizes and can also be placed in different positions on the apparatus 2. One of the important determining factors as to size of the hydraulic pump 28 and the cylinders 38 and 40 is what the desired use of the present invention would be.

I claim:

1. An apparatus for raising and lowering heavy objects from a position on a floor to a desired height and vice versa comprising:

a lower support frame;

an upper support frame including a set of lower support bars joined to a set of upper support bars in a parallel arrangement, said upper support bars adjustable relative to said lower support bars, said upper support bars pivotable about means joining the set of upper support bars to the set of lower support bars such that said upper support bars are further pivotable about said lower support bars;

adjustment means connecting said lower support bars with said upper support bars at a point adjacent a front end of said lower support bars and said upper support bars, said adjustment means connected to an outer surface of said lower support bars and said upper support bars, said adjustment means for facilitating adjustment of said upper support bars relative to said lower support bars;

adjustable heavy object support means extending between the upper support bars;

one or more rotatable arm supports intermediate said lower support frame and the upper support frame; and a hydraulic pump for pumping fluid into one or more cylinders, said one or more cylinders for at least forcing said arm supports to raise said upper support frame.

2. The apparatus of claim 1 wherein the upper support frame may lower the heavy object to a floor surface.

3. The apparatus of claim 1 wherein the hydraulic pump is secured to the lower frame member.

4. The apparatus of claim 1 wherein the upper support bars include one or more corresponding aligned grooves for receiving one or more adjoining chains.

5. The apparatus of claim 1 wherein the lower support member further includes a plurality of wheels for providing mobility.

6. The apparatus of claim 1 wherein the adjustment means is a threaded rod joining each upper support bar to a corresponding lower support bar.

7. The apparatus of claim 1 wherein first ends of two cylinders are fixed to the lower support frame and second ends, including extendible shafts, are fixed to a first lower end of an elongated hinge device, said hinge device having a second end fixed to lower ends of at least two arm supports such that said extendible shafts, when extended, act upon the hinge devices causing them to rotate thereby causing the arm supports to raise the upper support and any corresponding heavy object supported thereby.

8. The apparatus of claim 7 wherein the hinge devices are rotatably engaged with a rigid rod connecting parallel beams of the lower support frame.

9. An apparatus for raising and lowering heavy objects from a position on a floor to a desired height and vice versa comprising:

a lower support frame including a U-shaped member positioned at a rear end thereof;

an upper support device including a pair of lower support beams and a pair of upper support beams in a parallel arrangement, said upper support beams adjustable in a vertical plane relative to said lower support beams and further pivotable about brackets joining the set of upper support bars to the set of lower support bars such that said upper support bars are further pivotable relative to said lower support;

adjustment rods connecting said lower support beams with said upper support beams at a point adjacent a front end of said lower support beams and said upper support beams, said adjustment rods connected to an outer surface of said lower support beams and said upper support beams, said adjustment rods for facilitating adjustment of said upper support beams relative to said lower support beams;

adjustable chains extending between the upper support beams, said chains for supporting the heavy object;

two pair of support arms intermediate said U-shaped member and the upper support frame; and a hydraulic pump for pumping fluid into one or more cylinders, said one or more cylinders positioned to force said pair of arm supports to raise said upper support device.

10. The apparatus of claim 9 wherein the upper support device may lower the heavy object onto a floor surface.

11. The apparatus of claim 9 wherein the hydraulic pump is secured to the U-shaped member.

12. The apparatus of claim 9 wherein the upper support beams include cut-outs for receiving one or more adjoining chains.

13. The apparatus of claim 9 wherein the lower support member further includes a plurality of wheels for providing mobility.

14. The apparatus of claim 9 wherein first ends of two cylinders are fixed to the U-shaped member and second ends, including extendible pistons, are fixed to a first lower end of an elongated hinge device, said hinge device having a second end fixed to lower ends of at least one pair of the arm supports such that said extendible pistons, when extended, act upon the hinge devices causing them to rotate thereby causing the pair of arm supports to raise the upper support and any corresponding heavy object supported thereby.

15. A method of handling heavy objects comprising:

providing an apparatus having a lower frame member and upper frame member, said upper frame member comprising two lower bar supports each joined to a corresponding upper bar support in a parallel configuration wherein said upper bar supports are pivotable about brackets joining the set of upper support bars to the set of lower support bars wherein said upper support bars are further pivotable relative to said lower bar supports;

providing adjustment means connecting said lower bar supports with said upper bar supports at a point adjacent a front end of said lower bar supports and said upper bar supports, said adjustment means connected to an outer surface of said lower bar supports and said upper bar supports, said adjustment means for facilitating adjustment of said upper bar supports relative to said lower bar supports;

adjustable heavy object support means extending between the upper bar supports;

providing one or more intermediate support arms for joining said lower and upper frame members;

positioning said upper frame member underneath said heavy object;

raising, by using a hydraulic pump to force fluid into one or more cylinders joined thereto, said upper frame member to underneath and proximate said heavy object such that one or more adjustable load-carrying elements are in position to receive the heavy object;

causing said heavy object to be placed on said load-carrying elements; and positioning said apparatus in a desired location.

16. The method of claim 15 further comprising lowering the heavy object to a floor surface.

17. The method of claim 15 wherein the hydraulic pump is secured to the lower frame member.

18. The method of claim 15 wherein the load-carrying elements are chains adjustably secured to said upper bar supports.

19. The method of claim 15 wherein the positioning is facilitated by a plurality of wheels affixed to said lower frame member.

20. The method of claim 15 wherein the adjustment means comprises threaded rods joining the upper bar supports to the lower bar supports.

21. The method of claim 15 wherein the heavy object is an automotive transmission.

22. A method of handling heavy objects comprising:

providing an apparatus having a lower frame member and upper frame member, said upper frame member comprising two lower bar supports each joined to a corresponding upper bar support in a parallel configuration wherein said upper bar supports are pivotable about brackets joining the set of upper support bars to the set of lower support bars wherein said upper support bars are further pivotable relative to said lower support bars;

providing adjustment rods connecting said lower bar supports with said upper bar supports at a point adjacent a front end of said lower bar supports and said upper bar support, said adjustment rods connected to an outer surface of said lower bar supports and said upper bar supports, said adjustment rods for facilitating adjustment of said upper bar supports relative to said lower bar supports;

providing adjustable heavy object support means extending between the upper bar supports;

providing one or more intermediate support arms for joining said lower and upper frame members;

positioning said upper frame member;

raising said upper frame member by using a hydraulic pump to force fluid into one or more cylinders joined thereto such that said cylinders act upon a pair of hinge devices causing said intermediate arm supports to raise the upper frame member underneath said heavy object such that one or more adjustable load-carrying elements are in position to receive the heavy object;

causing said heavy object to be placed on said load-carrying elements; and positioning, raising and lowering said upper frame member accordingly.

23. The method of claim 22 wherein the heavy object is an automotive transmission.

24. A method of capturing a vehicle transmission from a vehicle comprising:

providing an apparatus having a lower frame member and upper frame member, said upper frame member comprising two lower bar supports each joined to a corresponding upper bar support in a parallel fashion wherein said upper bar supports are adjustable relative to said lower bar supports and pivotable about brackets joining the set of upper support bars to the set of lower support bars wherein said upper support bars are further pivotable relative to said lower support bars;

providing adjustment rods connecting said lower bar supports with said upper bar supports at a point adjacent a front end of said lower bar supports and said upper bar support, said adjustment rods connected to an outer surface of said lower bar supports and said upper bar supports, said adjustment rods for facilitating adjustment of said upper bar supports relative to said lower bar supports;

providing adjustable heavy object support means extending between the upper bar supports;

providing one or more intermediate support arms for joining said lower and upper frame members;

positioning said upper frame member underneath said vehicle and said transmission;

raising, by using a hydraulic pump to force fluid into one or more cylinders joined thereto, said upper frame member to underneath and proximate said transmission such that one or more adjustable load-carrying elements are in position to receive the heavy object;

causing said transmission to be removed from said vehicle and positioned on said load-carrying elements; and moving said apparatus and transmission to a desired location.

* * * * *